United States Patent Office 2,976,318
Patented Mar. 21, 1961

2,976,318

TETRACYCLINE DERIVATIVES AND PROCESS OF PRODUCING THE SAME

Robert K. Blackwood, Gales Ferry, Conn., assignor to Chas. Pfizer & Co., Inc., Brooklyn, N.Y., a corporation of Delaware No Drawing. Filed May 18, 1959, Ser. No. 813,653

8 Claims. (Cl. 260—559)

This invention is concerned with new and useful derivatives of tetracycline antibiotics and more particularly with derivatives of tetracyclines formed by reaction with organic isocyanates, as well as the process of preparing same.

The tetracycline antibiotics comprise a group of biologically active perhydronaphthacene derivatives having the following essential structural features. The numbering system indicated is that employed by "Chemical Abstracts."

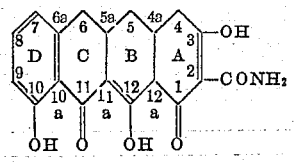

Among the biologically active members of this group are those containing the following substituent groups:

| Substituents | Common Name |
|---|---|
| 4-N(CH$_3$)$_2$,6-OH,6-CH$_3$,12a-OH | tetracycline. |
| 4-N(CH$_3$)$_2$,5-OH,6-OH,6-CH$_3$,12a-OH | 5-oxytetracycline. |
| 4-N(CH$_3$)$_2$,6-OH,6-CH$_3$,7-Cl,12a-OH | 7-chlorotetracycline. |
| 4-N(CH$_3$)$_2$,5-OH,6-CH$_3$,12a-OH | 6-deoxy-5-oxytetracycline. |
| 5-OH,6-CH$_3$,12a-OH,6-OH | 4-desdimethylamino-5-oxytetracycline. |
| 4-N(CH$_3$)$_2$,6-CH$_3$,12a-OH | 6-deoxytetracycline. |
| 4-N(CH$_3$)$_2$,12a-OH | 6-deoxy-6-demethyltetracycline. |
| 4-N(CH$_3$)$_2$,6-OH,6-CH$_3$,7-Br,12a-OH | 7-bromotetracycline. |
| 4-N(CH$_3$)$_2$,6-OH,7-Cl,12a-OH | 6-demethyl-7-chlortetracycline. |
| 6-OH,6-CH$_3$,12a-OH | 4-desdimethylaminotetracycline. |
| 6-OH,6-CH$_3$,7-Cl,12a-OH | 4-desdimethylamino-7-chlortetracycline. |
| 4-N(CH$_3$)$_2$,6-OH,12a-OH | 6-demethyltetracycline. |

The new and useful compounds of the present invention are derivatives of tetracycline antibiotics formed by reaction with organic isocyanates. A variety of organic isocyanates are found to react with the tetracycline antibiotics for example, arylisocyanates, alkylisocyanates, acylisocyanates, and the like. Of particular value are arylisocyanates, especially phenyl and substituted phenyl-isocyanates as hereinafter described. The present new compounds are represented by the following formulae:

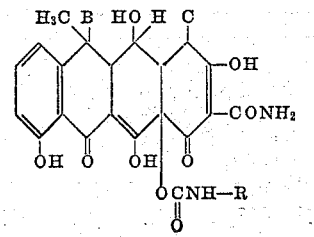

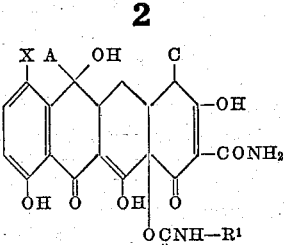

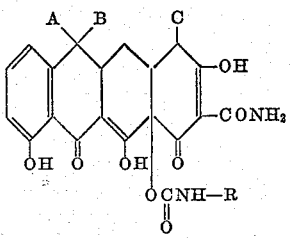

wherein A is selected from the group consisting of H and CH$_3$, B is selected from the group consisting of H and OH, C is selected from the group consisting of H and N(CH$_3$)$_2$, X is selected from the group consisting of Cl and Br, R is selected from the group consisting of aryl represented by the formulae:

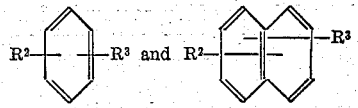

wherein R$^2$ and R$^3$ are each selected from the group consisting of hydrogen, halogen, nitro, amino, lower alkyl and lower alkoxy; R$^1$ is selected from the group consisting of aryl represented by the formulae:

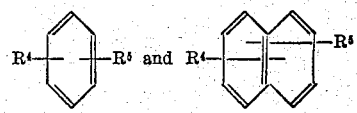

wherein R$^4$ and R$^5$ are each selected from the group consisting of hydrogen, halogen, nitro, lower alkyl and lower alkoxy; and the acid and base salts thereof.

The process of preparing the present new compounds is brought about by merely contacting the tetracycline antibiotic with the selected isocyanate. At least an equimolar amount of isocyanate should be employed to obtain appreciable amounts of the desired product. It is generally desirable, but not essential, to employ small excesses, say 10% to 20%, of isocyanate for best results. Large excesses may be employed but provide no appreciable advantage. The reaction is best effected in an inert, organic solvent for the reactants. By "inert," as employed herein, is meant a solvent which does not react with the reagents or the products under the conditions of the process. Exemplary of such solvents are tetrahydrofuran, dioxane, dialkyl ethers of ethylene and diethylene glycols, such as the dimethyl ether of ethylene glycol, acetone, and the like. A minimum of laboratory experimentation will determine appropriate solvents. As can be readily appreciated by those skilled in the art, it is desirable to effect the present process in the absence of water because of its facile reaction with isocyanates. It is generally preferred, for this reason to carry out the present process under substantially anhydrous conditions although minor traces of water are not found to seriously impede the production of the desired product. The use of small excesses of isocyanate to react with any trace quantities of moisture is found helpful.

Temperature does not appear to be critical in the present process. The reaction is successfully carried out at room temperature, about 25° C., and at even lower temperatures. Higher temperatures may be used but they merely lead to a shortened reaction time. The use of temperatures of higher than about 100° C. should be avoided since it may lead to reduced yield of product.

The progress of the reaction may be conveniently followed by means of paper chromatography, using conventional solvent systems, such as nitromethane, chloroform; pyridine (20, 10, 3). The present new products with the exception of aminophenylcarbamyltetracycline, are found to follow the solvent front in this system. Although product formation is almost instantaneous at room temperature, a reaction time of from about 2 to about 12 days is usually preferred to ensure conversion of substantially all of the tetracycline to the desired product, thus minimizing the necessity of costly and time-consuming separation of product from starting compounds. The reaction time will of course depend on the temperature employed. The time required for completion of reaction is indicated by papergram analysis for tetracycline starting compound using an aliquot of the reaction mixture. A minimum of laboratory experimentation will indicate the optimum time. After the reaction is complete, the products are obtained by conventional procedures. One such procedure involves the addition of a non-solvent to the reaction mixture, followed by removal of the separated product, e.g. by filtration or centrifugation. Then, if desired, the product may be crystallized by standard procedures.

The present new compounds in which the arylcarbamyl moiety is substituted by an amino group are prepared by reduction of the corresponding nitroarylcarbamyl compound. This reduction may be brought about by usual procedures known to those skilled in the art. One such procedure is hydrogenation in the presence of Raney nickel at room temperature and pressures of hydrogen gas slightly higher than atmospheric pressure. Under the conditions of reduction, halogen on the tetracycline nucleus is reductively removed to afford corresponding tetracycline derivatives. Thus, $O^{12a}$-(p-nitrophenylcarbamyl)-7-chlortetracycline is converted to $O^{12a}$-(p-aminophenylcarbamyl)tetracycline by this hydrogenation.

The present new compounds are effective in combatting disease caused by pathogenic microorganisms. Many of these compounds show appreciable activity against resistant strains of microorganisms. Tables I, II and III illustrate the activity of some of the new compounds of the present invention against a group of microorganisms which cause various diseases. A number of these microorganisms are resistant to other known antimicrobial agents. The tests were carried out by the serial dilution technique. According to this technique, a nutrient medium was prepared containing the selected agent at a concentration of 100 mcg./ml. Aliquots of this medium were diluted with varied volumes of the inoculum so that there was obtained tubes containing the selected agent at a concentration of 100, 50, 25, 12.5, 6.25, 3.12, 1.56, 0.78, 0.39 and 0.19 mcg./ml. These tubes were then incubated with the test organism to determine the extent to which the microorganism grows in the presence of the antibacterial agent. In this fashion, the minimum inhibitory concentration (M.I.C.) of the selected agent was determined.

TABLE I

Antimicrobial Activity in vitro of $O^{12a}$-(2,5-dichlorophenylcarbamyl)oxytetracycline

| Microorganism: | MIC (mcg./ml.) |
|---|---|
| Micrococcus pyogenes var. aureus | 0.78 |
| Streptococcus pyogenes | 1.86 |
| Streptococcus faecalis | 6.3 |
| Diplococcus pneumoniae | 6.3 |
| Erysipelothrix rhusiopathiae | 3.16 |
| Corynebacterium diphtheriae | 1.5 |
| Listeria monocytogenes | 12.5 |
| Bacillus subtilis | 0.78 |
| Lactobacillus casei | 25 |
| Bacterium ammoniagenes | 6.3 |
| Aerobacter aerogenes | 100 |
| Escherichia coli | 50 |
| Salmonella typhosa | 12.5 |
| Salmonella pullorum | 25 |
| Klebsiella pneumoniae | 25 |
| Neisseria gonorrhoeae | 25 |
| Hemophilus influenzae | 6.3 |
| Shigella sonnei | 12.5 |
| Erwinia amylovora | 1.86 |
| Phytomonas tumefaciens | 100 |
| Brucella bronchiseptica | 12.5 |
| Desulfovibrio desulfuricans | 100 |
| Vibrio comma | 3.2 |
| Pasteurella multocida | 1.56 |
| Mycobacterium 607 | 3.12 |
| Mycobacterium berolinense | 0.87 |
| Xanthomonas vesicatoria | 25 |
| Phytomonas phaseolicola | 50 |

ANTIBIOTIC RESISTANT STRAINS OF *MICROCOCCUS PYOGENES* VAR. *AUREUS*

| | |
|---|---|
| 376 | 25 |
| 400 | 12.5 |

TABLE II

Antimicrobial Activity in vitro of $O^{12a}$-(p-methoxyphenylcarbamyl)tetracycline

| Microorganism: | MIC (mcg./ml.) |
|---|---|
| Micrococcus pyogenes var. aureus | 25 |
| Streptococcus pyogenes | 12.5 |
| Streptococcus faecalis | 50 |
| Diplococcus pneumoniae | 50 |
| Erysipelothrix rhusiopathiae | 25 |
| Corynebacterium diphtheriae | 12.5 |
| Listeria monocytogenes | 50 |
| Bacillus subtilis | 6.3 |
| Bacterium ammoniagenes | 50 |
| Salmonella pullorum | 100 |
| Neisseria gonorrhoeae | 50 |
| Hemophilus influenzae | 12.5 |
| Shigella sonnei | 100 |
| Phytomonas tumefaciens | 6.3 |
| Brucella bronchiseptica | 25 |
| Desulfovibrio desulfuricans | 12.5 |
| Vibrio comma | 12.5 |
| Pasteurella multocida | 25 |
| Mycobacterium 607 | 25 |
| Mycobacterium berolinense | 6.3 |
| Xanthomonas vesicatoria | 50 |

ANTIBIOTIC RESISTANT STRAINS OF *MICROCOCCUS PYOGENES* VAR. *AUREUS*

| | |
|---|---|
| 376 | 50 |
| 400 | 50 |

In addition to their use as antibacterial agents the present new compounds are also useful as intermediates in the preparation of other antibacterial agents. They may, on hydrogenolysis in the presence of a noble metal catalyst, be converted to the corresponding 12a-deoxytetracyclines by the method described in copending application, Serial No. 813,654 filed May 18, 1959. Of course, those aryl-carbamyl tetracyclines which contain bromine or chlorine on the tetracycline nucleus are converted to 12a-deoxytetracyclines due to the concomitant reductive removal of the halogen atom under the conditions of hydrogenolysis. The 12a-deoxytetracyclines are very effective antibacterial agents. Further, the present new compounds may be converted to the corresponding 4a,12a-anhydrotetracyclines which are also antibacterial agents. This latter process involves heating the selected $O^{12a}$-(phenylcarbamyl)tetracycline in toluene at reflux temperature.

The present new compounds, being amphoteric, form salts with both acids and bases. For example they form salts with mineral acids such as phosphoric, nitric, sulfuric, hydrochlorid and hydrobromic as well as with hydrocarbon carboxylic and sulfonic acids containing up to 10 carbon atoms, for example, tartaric, glycolic, citric, gluconic, malic, maleic, succinic, propiolic, acetic, benzoic, benzenesulfonic, napthalenesulfonic, methylsulfonic and tolylsulfonic. Additionally they form various metal salts, for example, alkali and alkaline earth metal salts such as sodium, potassium, calcium and magnesium salts, as well as aluminum, zinc, iron etc. salts. Of course, it is not intended to include within the purview of this invention those acids, the anion of which alters the tetracycline antibiotic by reaction with same, for example, manganic, chromic and permanganic acids which are strong oxidizing agents. The salts of the present compounds possess antimicrobial activity. These salts may be prepared by standard procedures well known in the art, such as reacting an equivalent of the antibiotic and acid or base in a lower alkanol followed by addition of a non-solvent or concentration. Of particular value are salts formed with pharmaceutically-acceptable acids or bases. The salts with pharmaceutically-unacceptable acids and bases are useful in the purification of the antibiotic compounds and also as intermediates for the formation of pharmaceutically-acceptable salts.

The present novel antibiotic products are of appreciable value in the treatment of various infections in humans and animals. They may be administered by parenteral injection, orally or topically in customary dosage forms. For example, they may be used for oral application in powdered form, as in capsules and tablets, or in suspensions in aqueous liquids or edible oils such as sesame oil, peanut oil and the like. Solutions of the antibiotic compounds, as the amphoteric substance or in the form of soluble salts may be employed for parenteral administration.

The following examples are given by way of illustration and are not to be construed as limitations of this invention many variations of which are possible without departing from the scope and spirit thereof.

EXAMPLE I $O^{12a}$-(phenylcarbamyl)tetracycline

To a solution of 11 g. of anhydrous tetracycline in 125 ml. of tetrahydrofuran is added 10 ml. of phenylisocyanate. The mixture is allowed to stand for 5 days after which 1700 ml. of hexane is added with stirring. The resulting precipitate is filtered, washed with hexane and dried.

The product obtained is recrystallized by dissolving in hot ether and concentration under reduced pressure. Elemental analysis of the product gives the following results:

Calculated for $C_{29}H_{29}O_9N_3$: C, 61.8; H, 5.19; N, 7.46. Found: C, 61.9; H, 5.21; N, 7.47.

EXAMPLE II $O^{12a}$-(p-methoxyphenylcarbamyl)tetracycline

To a solution of 4.4 g. of anhydrous tetracycline in 50 ml. of tetrahydrofuran is added 5 ml. of p-methoxyphenylisocyanate. The mixture is allowed to stand for 12 days, after which it is diluted with 600 ml. of hexane. The precipitated product (5.5 g.) is then filtered, washed with hexane and dried. Elemental analysis of the product after recrystallization from ether gives the following results:

Calculated for $C_{30}H_{31}O_{10}N_3$: C, 60.70; H, 5.26; N, 7.08. Found: C, 59.85; H, 5.48; N, 6.93.

EXAMPLE III $O^{12a}$-(phenylcarbamyl)oxytetracycline

A solution of 2.3 g. of anhydrous oxytetracycline in 25 ml. of tetrahydrofuran is treated with 5 ml. of phenylisocyanate and allowed to stand for 12 days.

The product (3.2 g.) is obtained in the same manner as described in Example II.

EXAMPLE IV $O^{12a}$-(p-methoxyphenylcarbamyl)oxytetracycline

The procedure of Example III is repeated employing p-methoxyphenylisocyanate in place of phenylisocyanate to obtain the product (3.18 g.).

EXAMPLE V

A number of phenylcarbamyl tetracyclines are prepared by the procedure described in the previous examples from corresponding tetracycline and arylisocyanates. These are listed below:

$O^{12a}$-(o-chlorophenylcarbamyl)tetracycline
$O^{12a}$-(o-methoxyphenylcarbamyl)tetracycline
$O^{12a}$-(p-bromophenylcarbamyl)tetracycline
$O^{12a}$-(p-ethoxyphenylcarbamyl)tetracycline
$O^{12a}$-(2,5-dichlorophenylcarbamyl)tetracycline
$O^{12a}$-(2,5-dichlorophenylcarbamyl)-5-oxytetracycline
$O^{12a}$-(2,5-dichlorophenylcarbamyl)-7-chlorotetracycline
$O^{12a}$-(p-nitrophenylcarbamyl)tetracycline
$O^{12a}$-(p-nitrophenylcarbamyl)-6-demethyltetracycline
$O^{12a}$-(p-nitrophenylcarbamyl)-7-chlortetracycline
$O^{12a}$-(p-nitrophenylcarbamyl)-5-oxytetracycline
$O^{12a}$-(p-nitrophenylcarbamyl)desdimethylaminotetracycline
$O^{12a}$-(p-nitrophenylcarbamyl)desdimethylamino-7-chlortetracycline
$O^{12a}$-(p-nitrophenylcarbamyl)-7-chlortetracycline
$O^{12a}$(p-fluorophenylcarbamyl)-6-deoxytetracycline
$O^{12a}$-(phenylcarbamyl)-6-demethyltetracycline
$O^{12a}$-(2,4-dibromophenylcarbamyl)-6-deoxy-6-demethyltetracycline
$O^{12a}$-(2,5-dimethoxyphenylcarbamyl)-7-bromotetracycline
$O^{12a}$-(p-propoxyphenylcarbamyl)-6-deoxytetracycline
$O^{12a}$-(2,5-dichloro-1-naphthylcarbamyl)tetracycline
$O^{12a}$-(3,4-dimethyl-1-naphthylcarbamyl)-6-demethyltetracycline
$O^{12a}$-(8-nitro-1-naphthylcarbamyl)-desdimethylaminotetracycline
$O^{12a}$-(β-naphthylcarbamyl)-5-oxytetracycline
$O^{12a}$-(α-nahpthylcarbamyl)tetracycline
$O^{12a}$-(2-methyl-1-naphthylcarbamyl)-5-oxytetracycline
$O^{12a}$-(o-tolylcarbamyl)-5-oxytetracycline
$O^{12a}$-(p-propylphenylcarbamyl)-7-bromotetracycline
$O^{12a}$-(2-chloro-4-tolylcarbamyl)tetracycline
$O^{12a}$-(p-iodophenylcarbamyl)-6-deoxy-5-oxytetracycline
$O^{12a}$-[4-(o-xylyl)carbamyl]-6-demethyl-7-chlorotetracycline
$O^{12a}$-(p-butylphenylcarbamyl)-6-deoxytetracycline
$O^{12a}$-(2,4-dichlorophenylcarbamyl)tetracycline
$O^{12a}$-(2-NO$_2$-4-tolylcarbamyl)tetracycline It is obvious to those skilled in the art, that in lieu of the above described arylisocyanates, there may be employed any compound which is converted in situ to arylisocyanates. For example, the azide of benzoic acid, $C_6H_5CON_3$, rearranges, in solvent, to phenylisocyanate,

EXAMPLE VI

O¹²ᵃ-(p-aminophenylcarbamyl)tetracycline

O¹²ᵃ-(p-nitrophenylcarbamyl)tetracycline in tetrahydrofuran is shaken with hydrogen gas in the presence of 5% by weight of Raney nickel at room temperature and 40 p.s.i. in a standard Parr Shaker apparatus. The reaction is continued until the theoretical uptake of hydrogen gas is reached. The product is obtained by filtering off catalyst and concentrating at reduced pressure.

The same product is obtained when O¹²ᵃ-(p-nitrophenylcarbamyl)-7-chlortetracycline is used as starting compound.

EXAMPLE VII

The procedure of Example VI is repeated to prepare the following amino compounds from the corresponding nitro compounds:

O¹²ᵃ-(p-aminophenylcarbamyl)-5-oxytetracycline
O¹²ᵃ-(p-aminophenylcarbamyl)desdimethylaminotetracycline
O¹²ᵃ-(p-aminophenylcarbamyl)desdimethylamino-5-oxytetracycline
O¹²ᵃ-(p-aminophenylcarbamyl)-6-demethyltetracycline
O¹²ᵃ-(8-amino-1-naphthylcarbamyl)desdimethylaminotetracycline

EXAMPLE VIII

O¹²ᵃ-(phenycarbamyl)tetracycline hydrochloride

Three grams of the product of Example I is dissolved in a mixture of 30 ml. of tetrahydrofuran and 0.425 ml. of concentrated hydrochloric acid. On addition of 100 ml. of ether, the hydrochloride precipitates and is then filtered and washed with ether.

In a similar manner, other acid addition salts of the present new compounds are prepared.

EXAMPLE IX

The product of Example I is dissolved in an aqueous solution containing an equivalent amount of sodium hydroxide. The aqueous solution is frozen and dried at reduced pressure to obtain the sodium salt of O¹²ᵃ-(phenylcarbamyl)tetracycline as a powder.

In similar fashion, the potassium, barium and calcium salts are obtained.

The new compounds described in the previous examples on ultraviolet and infra red absorption analysis give spectra which are closely similar to those of the tetracycline antibiotic from which they are derived. Each of these compounds characteristically shows a maximum at or about 5.75 microns on infra red analysis. In their ultraviolet spectra, each characteristically shows maxima at about 265 mμ and 360 mμ. Of course substituents on the arylisocyanate may somewhat mask these maxima but there appears at least an inflection in the curve at these points.

EXAMPLE X

Five grams of the product of Example I is refluxed in 500 ml. of toluene for 24 hours. A white solid by-product collects in the condenser during the refluxing. The toluene solution is then filtered hot and concentrated to obtain solid product, 4a,12a-anhydrotetracycline.

EXAMPLE XI

A charge of 15 g. of the product of Example I, 300 ml. of tetrahydrofuran and 6 g. of 5% palladium on carbon is agitated on a Parr shaker apparatus at 50 p.s.i. pressure of hydrogen gas for 20 hours at 55° C. The mixture is then filtered and an equal volume of methanol added to the filtrate. After concentration to ⅓ volume at reduced pressure, 12a-deoxytetracycline separates as orange-red crystals, M. about 230° C. (d.).

In similar fashion, the products of Examples 1 through 6 are converted to the corresponding 12a-deoxytetracyclines.

What is claimed is:
1. A compound selected from the group consisting of:

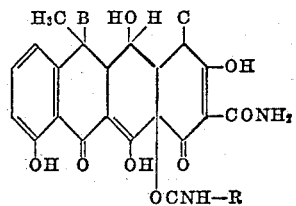

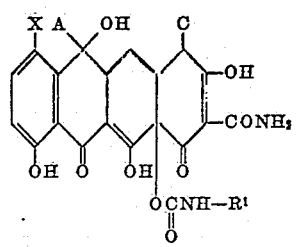

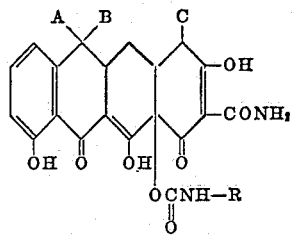

wherein A is selected from the group consisting of H and $CH_3$; B is selected from the group consisting of H and OH; C is selected from the group consisting of H and $N(CH_3)_2$; X is selected from the group consisting of Cl and Br; R is selected from the group consisting of aryl represented by the formulae:

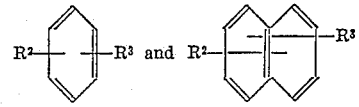

wherein $R^2$ and $R^3$ are each selected from the group consisting of hydrogen, halogen, nitro, amino, lower alkyl and lower alkoxy; and $R^1$ is selected from the group consisting of aryl represented by the formulae:

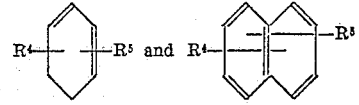

wherein $R^4$ and $R^5$ are each selected from the group consisting of hydrogen, halogen, nitro, lower alkyl and lower alkoxy; mineral acid salts, hydrocarbon carboxylic and sulfonic acid salts in which said acid contains up to 10 carbon atoms, and alkali and alkaline earth metal salts thereof.

2. O¹²ᵃ-(phenylcarbamyl)tetracycline.
3. O¹²ᵃ-(2,5-dichlorophenylcarbamyl)tetracycline.
4. O¹²ᵃ-(4-nitrophenylcarbamyl)desdimethylaminotetracycline.
5. O¹²ᵃ-(phenylcarbamyl)-5-oxytetracycline.
6. O¹²ᵃ-(phenylcarbamyl)tetracycline hydrochloride.
7. O¹²ᵃ-(2,5-dichlorophenylcarbamyl)-5-oxytetracycline.
8. A process which comprises contacting a tetracycline compound selected from the group consisting of:

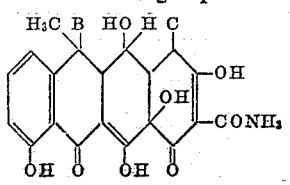

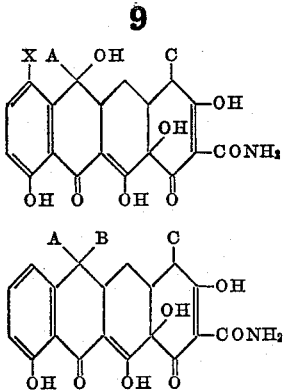

wherein A is selected from the group consisting of H and CH$_3$, B is selected from the group consisting of H and OH, C is selected from the group consisting of H and N(CH$_3$)$_2$, and X is selected from the group consisting of Cl and Br, with at least an equimolar amount of an arylisocyanate selected from the group consisting of phenylisocyanate, naphthylisocyanates, and mono- and disubstituted phenylisocyanates and naphthylisocyanates in which the substituent is selected from the group consisting of halogen, nitro, lower alkyl and lower alkoxy, in a reaction-inert organic solvent for the reactants under substantially anhydrous conditions.

<p style="text-align:center">No references cited.</p>